United States Patent [19]
Jones

[11] Patent Number: 4,987,019
[45] Date of Patent: Jan. 22, 1991

[54] GIFT WRAP DESIGN

[76] Inventor: Carolyn S. Jones, 2102 N. Vancouver, Tulsa, Okla. 74127

[21] Appl. No.: 738,408
[22] Filed: May 28, 1985
[51] Int. Cl.[5] ........ B32B 3/16
[52] U.S. Cl. ........ 428/42; 428/40; 428/41; 428/43; 428/131; 428/134; 428/136; 428/137; 428/914
[58] Field of Search ........ 156/249, 247, 248, 250, 156/268, 62, 63; D11/184; 40/2 R; D20/22; 428/40–43, 131, 134, 136, 137, 914

[56] References Cited

U.S. PATENT DOCUMENTS 3,384,982 5/1968 Herbert et al. ........ 156/63
3,522,136 7/1980 Williams et al. ........ 428/41
4,454,180 6/1984 La Mers ........ 428/42
4,507,166 3/1985 Posner ........ 156/248
4,594,276 6/1986 Relyea ........ 428/40

*Primary Examiner*—Pamela R. Schwartz
*Attorney, Agent, or Firm*—Head & Johnson

[57] ABSTRACT

This is a novel composition and method of creating one's own design for packages. A design sheet of a selected design or color is peelable from a backing sheet. The design sheet is provided with a plurality of non-contiguous holes cut therein and arranged in rows. The first sheet is cut between the holes in each row so that a plurality of peelable design building units are formed. These designed building units are placed on the package which is desired to decorate with the designer forming his own pattern.

5 Claims, 2 Drawing Sheets

GIFT WRAP DESIGN

BACKGROUND OF THE INVENTION

This is a composition and method for decorating packages or other objects.

This invention relates especially to the decorating of packages such as Christmas packages but can also be used for birthday gifts and so forth. A most common way of decorating gift packages is to wrap the box in which the gift is with a special decorative paper which may be of any color or design desired. Solid colors are frequently used and are further decorated by putting bows and ribbons thereon. This looks nice under a Christmas tree but it does have the problem of keeping the bows uncrushed, especially when the objects are to be mailed or if large numbers are to be stacked in a confined place. There is, thus, a need for adding the final decorative touch to gift packages without using a bow. My invention herein provides such a method.

SUMMARY OF THE INVENTION

My invention is a way of adding the final decorative touch to wrapped objects such as Christmas gifts and the like. I have developed a product which one can use either routinely or can use in a creative manner to make a decorative design for wrapped gifts. The resulting design can replace the normal bows and the like and lies flat so that it can be transported by mail or stored in confined areas. My invention is a product which has a first or design sheet, which is used in the decorations, peelably mounted on a backing sheet. The decorative sheet is provided with a plurality of rows of non-contiguous holes cut in the decorative sheet leaving "lands" between each hole. In each row, these lands have been cut into between the two holes. When it is desired to decorate a package, I peel the lands between the two rows of cuts to obtain a design building unit. I take these design building units and place them in any selected manner upon the wrapped gift. I can select the color of my design sheet to be appropriate for the color of the wrapping paper.

It is thus an object of my invention to provide a novel means of decorating packages and the like.

A better understanding of the invention can be had from the following description taken in conjunction with the drawings.

DETAILED DESCRIPTION OF THE PREFERRED EMBODIMENT

Figure 1:
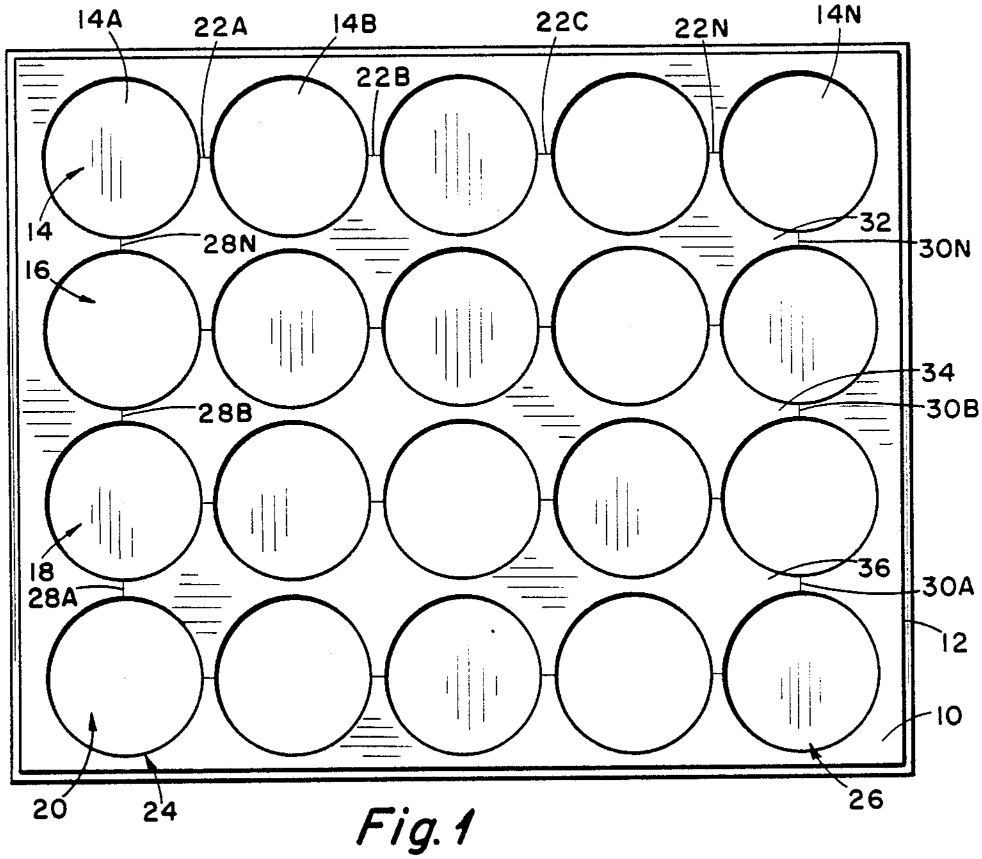
FIG. 1 is a plan view of my product used for decorating packages.
Figure 2:
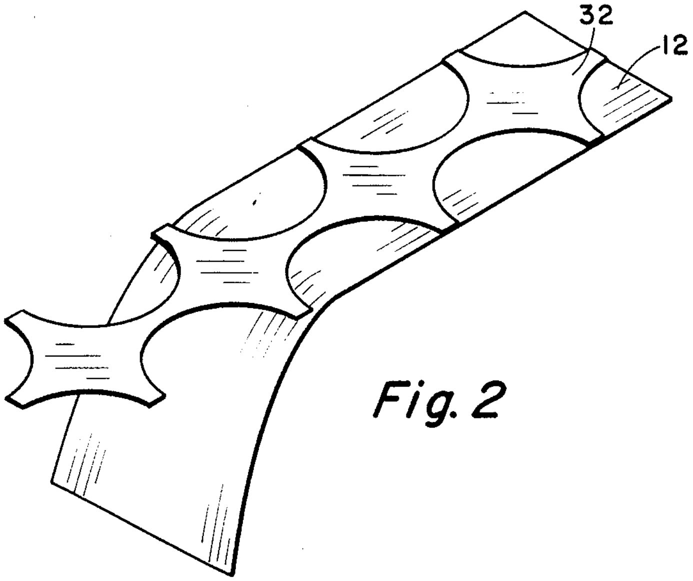
FIG. 2 shows a design building unit being peeled from its backing.

Attention is first directed to FIGS. 1 and 2. Shown in FIG. 1 is a design sheet 10 peelably mounted on backing sheet 12. As can be seen, there are a plurality of horizontal rows 14, 16, 18 and 20 of holes. Row 14 has holes 14A through 14N. The number of holes can be any number which may be desired. In FIG. 1, the holes are circular and are in a rectangular patter. This is preferred. The lands or material of the design sheet between holes have been cut. This is indicated by lines 22A, 22B, 22C and 22N between circles or holes 14A, 14B through 14N. This is repeated for rows 16, 18 and 20. The lands between the circles of vertical rows 24 and 26 have also been cut by cuts 28A, 28B and 28N and 30A, 30B, and 30N respectively. It is thus seen that there are a plurality of design building units 32, 34 and 36.

One such design building unit 32 is clearly shown in FIG. 2 as being in the process of being peeled from the backing 12. Ordinarily, the backing 12 would not be cut in strips as shown in FIG. 2 which shows the backing cut in a strip for ease of illustration.

Figure 3:
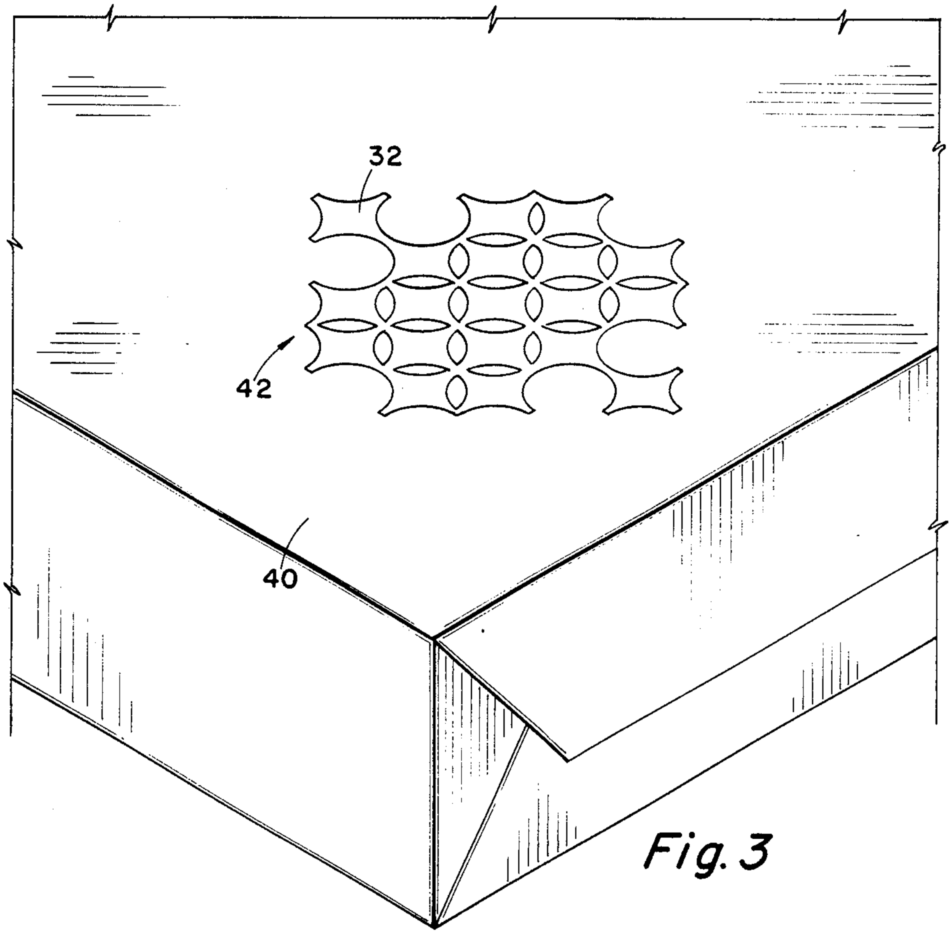
FIG. 3 illustrates one form of using the design building unit for creating a decorative design.

Attention is next directed to FIG. 3 which shows how a plurality of the design building units 32 can be arranged on paper 40 to form a design 42. The design building units 32, when they are peeled from backing 12, contain a sticky substance which adheres to the wrapping paper in the position on which it is placed. While I have shown only one design in FIG. 3, other designs, using my design building units can be used. I have shown the use of circles for the holes to make the design building units 32. This is my preferred configuration. However, the holes may take on other configurations such as an octagonal shape.

Figure 4:
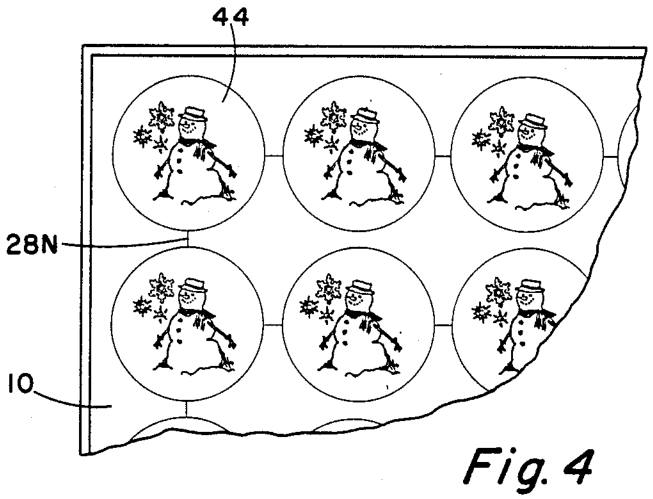
FIG. 4 illustrates a modification of the device of FIG. 1 in which there are individual design packages in the holes of FIG. 1 which may be used independently of the design building units.

As shown in FIGS. 1 and 2, the holes 14A have been cut out and there is no material in the design sheet 10 in each hole. However, attention is directed to FIG. 4. There, I produce individual patches 44 in each hole 14A. These patches are peelable and can be used as name tags or other use on the package itself. The lands 32 are cut and used in the same manner as described above.

It is quite apparent that by using my invention that any number of designs can be created by the individual wrapping the gifts. It is further apparent that by using my design that I can create a decorative gift without using bows. Thus, where bows cannot be used because they might be crushed or where it is just not desired to use bows, I provide a fine alternate method of decorating gifts. It also permits the individual to use his or her own creativity.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A product for decorating gift packages which comprises:

a backing sheet;

a peelable design sheet on said backing and having a rear side and a first side, said first side being aesthetic, said design sheet having an adhesive material on the rear side thereof;

said design sheet having a plurality of rows of non-contiguous holes and including design building units having a first side which is aesthetic and formed by cuts between selected holes of said design sheet.

2. A product as defined in claim 1 in which said holes are of the same size and configuration and equally spaced to form rectangular configuration having vertical rows having a bottom and top row.

3. A product as defined in claim 2 which there is a cut-through the design sheet on a vertical line through the center of each said hole in each vertical row and a cut-through the design sheet on a line through the top and bottom rows.

4. A product as defined in claim 3 in which each said hole is provided with a peelable individual decorative patch.

5. A product as defined in claim 2 in which each said hole is circular.

* * * * *